May 15, 1956  W. A. BEDFORD, JR  2,745,458
RESILIENTLY RETAINED FASTENER WITH FLANGE DETENT
Filed June 20, 1950
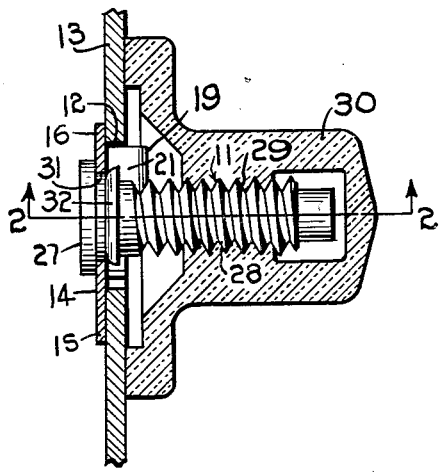
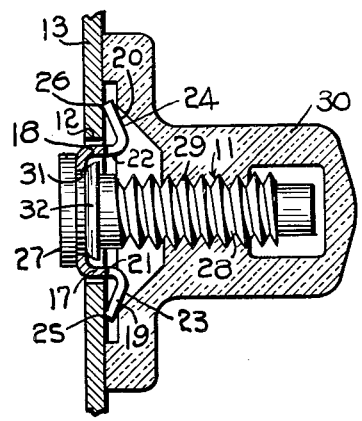
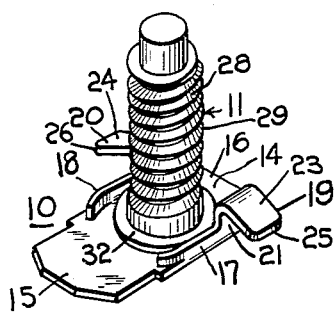
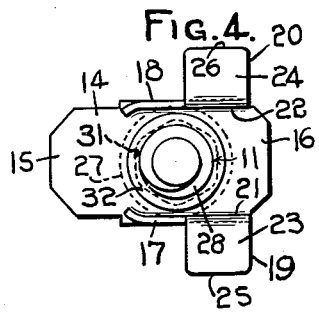
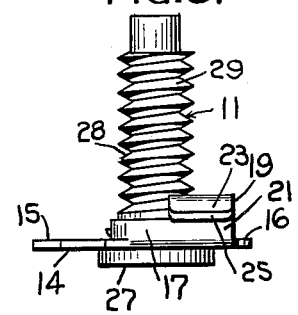
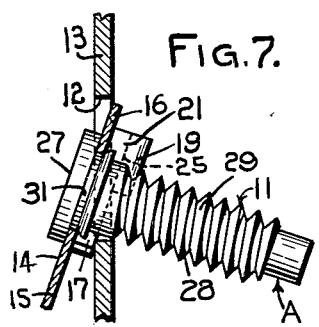
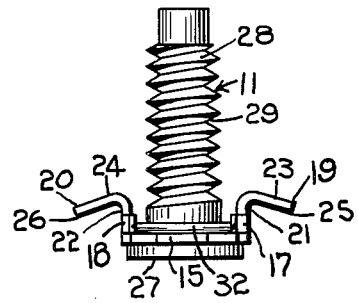
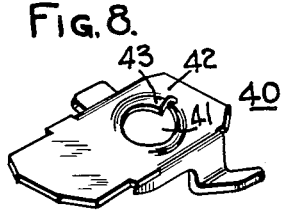
INVENTOR:
WILLIAM A. BEDFORD JR.
By Robert E. Ross
AGENT.

United States Patent Office 2,745,458
Patented May 15, 1956

2,745,458

RESILIENTLY RETAINED FASTENER WITH FLANGE DETENT

William A. Bedford, Jr., North Scituate, Mass., assignor, by mesne assignments, to United-Carr Fastener Corporation, Boston, Mass., a corporation of Delaware Application June 20, 1950, Serial No. 169,175

3 Claims. (Cl. 151—41.75)

This invention relates to fastener installations, and more particularly to fastener-secured supporting or mounting devices for such installations, and aims generally to improve existing devices of this type.

A primary object of the invention is the provision of an improved mounting or supporting device for knobs, handles, shelf supports and other like articles of manufacture by which such devices may be quickly and easily secured to an apertured support by a simple manipulative procedure carried out from the outward or accessible side thereof.

A further object of the invention is the provision of an improved mounting device of the kind described provided with a sheet metal fastening member of inexpensive construction which may be easily and quickly applied to fastening position in interlocked engagement with an apertured supporting structure, and retained in such fastening position against inadvertent disconnection or accidental removal without the use of extraneous bolts, screws, rivets or the like attaching means.

A still further object of the invention is the provision of a mounting for handles, shelf supports and the like comprising a fastening device having a cooperating shank member, the fastening member being adapted to be snapped into and out of interlocking engagement with an apertured support by rocking the shank member.

Another object of the invention is the provision of an improved fastener device of simple economical and durable construction provided with an improved arrangement of parts facilitating application of the device into interlocked engagement with an apertured support in a blind fastening installation and maintaining such interlocked engagement before and after an article is secured thereto.

The above and other objects and advantages of the invention will be apparent to persons skilled in the art to which the invention pertains from a consideration of the accompanying drawings and annexed specification illustrating and describing a preferred embodiment of the invention.

In the drawings:

Fig. 1 is a vertical sectional view of the device of the invention as applied in securing a shelf support to an apertured supporting wall;

Fig. 2 is a horizontal sectional view of the device taken on line 2—2 of Fig. 1;

Fig. 3 is a perspective view of the mounting;

Fig. 4 is a top view of the mounting;

Fig. 5 is a side view of the mounting;

Fig. 6 is an end view of the mounting;

Fig. 7 is a side view showing the position of the mounting just prior to being snapped into interlocked engagement with an apertured support;

Fig. 8 is a perspective view of a modified form of the fastening device having an opening with a helical edge to receive a threaded bolt for fastening thereto; and Fig. 9 is a perspective view of another modified form of the fastening device in which an internally threaded shank is provided for receiving a threaded member.

Referring to the drawings, the improved mounting device of the invention comprises a fastening member 10 and a cooperating fastener member 11 adapted to be mounted as a unit in an aperture 12 of a supporting wall 13 which may be a wall of a blind installation, for example, a refrigerator wall which is accessible from only one side thereof. The aperture 12 may be of any desired configuration such as square, round, rectangular or the like, and of a suitable size to permit the fastener member 10 to be snapped thereinto for interlocking engagement with the supporting wall 13.

The fastening member 10 is preferably formed from sheet metal, for example sheet steel, and comprises a body or head portion 14 having support-engaging lips or edge portions 15 and 16 extending from the ends thereof for bearing engagement with the rear inaccessible face of a supporting wall 13 adjacent the edges of the aperture 12. Laterally thereof the body or head portion 14 is provided with oppositely disposed offset flanged portions 17 and 18 disposed in axially spaced parallel planes and preferably formed by bending or turning the material of a blank substantially at right angles to the body portion 14.

The offset portions 17 and 18 are constructed and arranged to properly position the fastening member 10 on an apertured support and in conjunction with the edge portions 15 and 16 and the prongs or spring fingers 19 and 20, hereinafter described, to lock and maintain the fastening member in correctly mounted position. Desirably the portions 17 and 18 are of a length somewhat shorter than the length of the aperture 12 and are spaced apart a distance somewhat less than the width of the aperture 12. This permits ready mounting of the fastening member in the aperture but limits movement thereof with respect to the supporting wall by virtue of the ends of the flanged portions 17 and 18 coming into contact with the end wall of the aperture and the sides of the flanged portions 17 and 18 coming into contact with the side walls of the aperture.

The prong or spring fingers 19 and 20 may desirably be formed as integral extensions of the offset flanged portions 17 and 18 and comprise upwardly extending flat portions 21 and 22 disposed in the planes of the offset portions 17 and 18 adjacent the ends thereof, and provided with outwardly extending portions 23 and 24 terminating in the downwardly directed support-engaging edges 25 and 26. When mounted in an apertured support as shown in Figs. 1 and 2, the terminal edges 25 and 26 of the springs 19 and 20 resiliently engage the outer face of the support, thus holding the fastening member in mounted position with the edge portions 15 and 16 of the body portion 14 in engagement with the rear face of the support.

The fastener member 11 is preferably formed as a stud or shank with a head portion 27 and a shank portion 28 which may have external threads 29 for cooperating with an internally threaded shelf support or knob 30 or alternatively may be a socket member provided with internal threads for cooperation with a suitable type of threaded stud member. The member 11 is mounted in an aperture 31 in the fastening member 10 and rigidly secured thereto in any suitable manner as by swaging or upsetting the shank portion 28 as at 32 against the face of the body portion 14 opposite the head portion 27.

Alternatively, the fastening member 10 and cooperating fastener member 11 may be formed integrally from a single blank of material by any suitable pressing, stamping or other type operation. Generally, however, it will be found more expedient and more economical to form the two separately and then secure them together in any suitable manner such as that hereinabove described.

In the illustrated construction the stud or shank member 11 not only serves as an attaching means for a shelf support or like device, but also serves as a lever or mounting member which may be rocked or manipulated to facilitate assembly and disassembly of the device with an apertured support. The latter function will be more clearly apparent from the following description of the manner of assembling and disassembling the device with an apertured support.

Referring to Fig. 7, the device is assembled with an apertured support by first inserting the end 15 of the fastening member through the aperture 12 of the support so that the upper edges of the offset flanged portions 17 and 18 rest against an inner edge of the aperture, the shank portion 28 of the stud member 11 rests against an outer edge of the aperture and the terminal ends of the spring fingers 19 and 20 rest against the front face of the support. This brings the edge 16 of the fastening member opposite and inwardly of the adjacent face of the aperture 12.

The stud member 11 is then rocked in a counter-clockwise direction by an inward and upward pressure against the end portions thereof as indicated by the arrow A. This causes the fastening member 10 to pivot in a counter-clockwise direction so that the edge 16 thereof moves inwardly to clear the inner edge of the aperture 12. The upward pressure on the stud member 11 then slides the fastening member upwardly until the ends of the offset flanged portions 17 and 18 clear the adjacent edge of the aperture 12 and snap into the aperture 12 under the influence of the spring fingers 19 and 20. Simultaneously with this operation the edge 16 of the fastening member is moved into overlapping engagement with the rear face of the supporting wall and the mounting operation is complete.

In its mounted position the edges 15 and 16 of the fastening member are held in engagement with the rear face of the supporting wall by the spring fingers 19 and 20 and are prevented from shifting substantially with respect thereto by the offset flanged portions 17 and 18, the ends and sides of which are adapted to contact the inner faces of the aperture 12 to limit such shifting movement.

When the fastening member is in its fully mounted position, as shown in Figs. 1 and 2, the knob, shelf support, or similar device 30 is screw-threadedly engaged with the threaded shank portion 28 of the stud member 11 and threaded thereon into tight engagement with the outer face of the support. The device is then ready for use.

In disassembling the device the knob 30 is removed and the stud member 11 rocked in a clockwise direction by an inward and downward pressure on the end portions thereof. This pivots the fastening member in a clockwise direction against the restraining action of the spring fingers 19 and 20 and moves the offset portions 17 and 18 inwardly to clear the inner edge of the aperture 12. The fastening member is then free to move downwardly under the influence of the downward pressure exerted on the stud member 11 sufficiently to release the edge 16 thereof from locking engagement with the rear face of the supporting wall. The device may then be easily removed from the aperture.

Referring to Fig. 8, there is shown another embodiment of the invention in which a fastening member 40 is provided with an opening 41 in the body portion 42, and the edge 43 of the opening is formed into a helix for threaded engagement with a bolt (not shown) to enable an article to be attached thereto.

Another embodiment is illustrated in Fig. 9 in which a fastener 50 is provided with an internally threaded barrel 51, which extends outwardly from the body portion 52 to receive a bolt therein.

The method of assembly of the devices shown in Figs. 8 and 9 is similar to that hereinbefore described.

Since certain other obvious changes may be made in the device without departing from the scope of the invention, it is intended that all matter contained herein be interpreted in an illustrative and not in a limiting sense.

I claim:

1. A mounting device for assembly into an aperture in a supporting panel comprising an elongated flat base, flanges extending integrally from a portion of each side edge of said base at substantially right angles thereto, the front and rear vertical edges of each of said flanges being spaced adjacent to and inward from the front and rear edges of said base, integral resilient arms extending upwardly and outwardly from a top portion of each of said flanges adjacent to the rear vertical edges of said flanges thereby leaving each of said flanges with a longitudinal front top bearing edge, said arms extending laterally in opposite directions with relation to the base, and being inclined toward the plane of the base, thread receiving means centrally disposed on said base with respect to the width thereof and extending upwardly therefrom between and in the same direction as said flanges for engaging a threaded member, the top longitudinal bearing edge of each of said flanges providing bearing surfaces for engaging the edge of an aperture in a supporting panel on which the fastener is to be installed, the mounting device being so proportioned that the longitudinal length of said flanges is substantially equal to the distance from the forward end of said thread receiving means to the rear edge of said base, so that the forward end of said base may be inserted into such aperture in the support with the arms bearing against the front face of such support, and said bearing surfaces engaging the edges of the aperture behind the support, the fastener then being tilted so that said rear end of the base passes through such aperture and moved laterally to permit the said rear end of the base to become engaged with the back face of such support and the arms to become resiliently engaged with the front face while the vertical edges of the flanges are positioned adjacent opposite edges of the aperture to restrict substantially lateral movement of the device with respect to the aperture of such support.

2. A mounting device for assembly into an aperture in a supporting panel in accordance with claim 1 wherein the means for engaging a threaded member comprises an externally threaded stud member.

3. A mounting device for assembly into an aperture in a supporting panel in accordance with claim 1 wherein the forward vertical edges of the flanges extending from the base portion are provided with resilient finger portions.

References Cited in the file of this patent

UNITED STATES PATENTS

| | | |
|---|---|---|
| 1,826,419 | Butkus | Oct. 6, 1931 |
| 1,881,836 | Mitchell | Oct. 11, 1932 |
| 1,912,100 | Rosenberg | May 30, 1933 |
| 1,958,497 | Rivers | May 15, 1934 |
| 2,273,648 | Kost | Feb. 17, 1942 |
| 2,302,389 | Kost | Nov. 17, 1942 |
| 2,386,732 | Wohlhieter | Oct. 9, 1945 |
| 2,495,037 | Tinnerman | Jan. 17, 1950 |